United States Patent
Fujita et al.

(10) Patent No.: US 11,493,231 B2
(45) Date of Patent: Nov. 8, 2022

(54) INDOOR UNIT FOR AIR CONDITIONER

(71) Applicant: DAIKIN INDUSTRIES, LTD., Osaka (JP)

(72) Inventors: Hiroki Fujita, Osaka (JP); Kei Takenaka, Osaka (JP); Tomoyuki Haikawa, Osaka (JP); Hayato Nuno, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/677,739

(22) Filed: Feb. 22, 2022

(65) Prior Publication Data

US 2022/0178581 A1    Jun. 9, 2022

Related U.S. Application Data (63) Continuation of application No. PCT/JP2020/034723, filed on Sep. 14, 2020.

(30) Foreign Application Priority Data

Sep. 17, 2019  (JP) .............................. JP2019-168563

(51) Int. Cl.
*F24F 13/15*  (2006.01)
*F24F 11/80*  (2018.01)
(Continued)

(52) U.S. Cl.
CPC .............. *F24F 13/15* (2013.01); *F24F 11/65* (2018.01); *F24F 11/755* (2018.01); *F24F 11/79* (2018.01); *F24F 11/80* (2018.01)

(58) Field of Classification Search
CPC .. F24F 13/15; F24F 11/79; F24F 11/65; F24F 11/755; F24F 11/80
See application file for complete search history.

(56) References Cited

U.S. PATENT DOCUMENTS 5,913,890 A * 6/1999 Lee .................. G05D 27/02
                                                454/313
5,971,846 A * 10/1999 Cho ................... F24F 1/005
                                                454/285
(Continued)

FOREIGN PATENT DOCUMENTS

CN      104620058 A      5/2015
CN      108139103 A      6/2018
(Continued)

OTHER PUBLICATIONS

International Search Report for PCT/JP2020/034723 (PCT/ISA/210) dated Nov. 2, 2020.
(Continued)

*Primary Examiner* — Nelson J Nieves
(74) *Attorney, Agent, or Firm* — Birch, Stewart, Kolasch & Birch, LLP (57) ABSTRACT

An air-conditioner indoor unit (10) is configured to be capable of changing the direction of an airflow that is blown out through a blow-out port (15). The air-conditioner indoor unit (10) includes a control unit (40) that switches between a normal mode and a wide mode. The control unit (40) switches to the wide mode when an air conditioning load is higher than a predetermined value and extends at least vertically a range that is to be reached by the airflow in an air-conditioning target space in the wide mode compared with the normal mode.

20 Claims, 8 Drawing Sheets

(51) Int. Cl.
  *F24F 11/65*   (2018.01)
  *F24F 11/79*   (2018.01)
  *F24F 11/755*  (2018.01)

(56) References Cited

U.S. PATENT DOCUMENTS

| | | | | |
|---|---|---|---|---|
| 11,320,162 B2* | 5/2022 | Kusukame | ............ | G01J 5/0025 |
| 2006/0286923 A1 | 12/2006 | Oka et al. | | |
| 2012/0174608 A1* | 7/2012 | Kumamoto | ............ | F24F 1/0047 |
| | | | | 62/132 |
| 2014/0138043 A1* | 5/2014 | Matsumoto | ............ | F24F 1/0063 |
| | | | | 165/11.1 |
| 2014/0227961 A1 | 8/2014 | Yasutomi et al. | | |
| 2014/0308888 A1 | 10/2014 | Yasutomi et al. | | |
| 2015/0377503 A1* | 12/2015 | Nakamoto | ............ | F24F 1/0057 |
| | | | | 62/176.1 |
| 2017/0292732 A1 | 10/2017 | Kojima et al. | | |
| 2018/0119983 A1* | 5/2018 | Tezuka | .................... | F24F 1/027 |
| 2020/0049358 A1* | 2/2020 | Suciu | ........................ | F24F 11/79 |
| 2020/0072487 A1* | 3/2020 | Fujiwara | ................. | F24F 11/52 |
| 2020/0400334 A1* | 12/2020 | Ariga | ........................ | F24F 11/64 |
| 2021/0190370 A1* | 6/2021 | Kang | ................. | F24F 13/1486 |

FOREIGN PATENT DOCUMENTS

| | | |
|---|---|---|
| EP | 2 918 930 A1 | 9/2015 |
| EP | 3 348 928 A1 | 7/2018 |
| EP | 3 348 929 A1 | 7/2018 |
| EP | 3 358 266 A1 | 8/2018 |
| JP | 5-203221 A | 8/1993 |
| JP | 5-240488 A | 9/1993 |
| JP | 2003-21386 A | 1/2003 |
| JP | 2013-76530 A | 4/2013 |
| JP | 2013-96637 A | 5/2013 |
| JP | 2013-137162 A | 7/2013 |
| JP | 2013-238397 A | 11/2013 |
| JP | 2014-55746 A | 3/2014 |
| JP | 2015-169422 A | 9/2015 |
| JP | 2017-53568 A | 3/2017 |
| JP | 2017-67400 A | 4/2017 |
| JP | 2017-67401 A | 4/2017 |
| JP | 2018-185055 A | 11/2018 |
| WO | WO 2017/043492 A1 | 3/2017 |

OTHER PUBLICATIONS

Written Opinion of the International Searching Authority for PCT/JP2020/034723 (PCT/ISA/237) dated Nov. 2, 2020.

English translation of International Preliminary Report on Patentability and Written Opinion of the International Searching Authority for International Application No. PCT/JP/2020/034723, dated Mar. 31, 2022.

Extended European Search Report for European Application No. 20865540.7, dated Aug. 16. 2022.

* cited by examiner

INDOOR UNIT FOR AIR CONDITIONER

CROSS REFERENCE TO RELATED APPLICATIONS

This application is a Continuation of PCT International Application No. PCT/JP2020/034723, filed on Sep. 14, 2020, which claims priority under 35 U.S.C. 119(a) to Patent Application No. 2019-168563, filed in Japan on Sep. 17, 2019, all of which are hereby expressly incorporated by reference into the present application.

TECHNICAL FIELD

The present disclosure relates to an indoor unit for an air conditioner.

BACKGROUND ART

To avoid wind of an indoor unit for an air conditioner from hitting a person and generating a draft feeling, PTL 1 suggests using a circulation airflow and a perpendicular airflow as airflows for uniform air conditioning of the entirety of a room without causing a person to feel wind.

CITATION LIST

Patent Literature

PTL 1: WO 2017/043492 A1

SUMMARY

A first aspect of the present disclosure is an indoor unit for an air conditioner, the indoor unit being configured to be installed in an air-conditioning target space and to be capable of changing a direction of an airflow that is blown out through a blow-out port (15). The indoor unit includes a control unit (40) configured to switch between a normal mode and a wide mode. The control unit (40) is configured to switch to the wide mode when an air conditioning load is higher than a predetermined value and extend at least vertically a range that is to be reached by the airflow in the air-conditioning target space in the wide mode compared with the normal mode. In the wide mode, when a range of 1600 mm high from a floor surface at a position away from the blow-out port (15) by any distance within a range of 1000 mm to 2000 mm on a front side is set as a reference height range, and among three ranges obtained by equally dividing the reference height range into three in a height direction, the range positioned on an upper side is set as a first range, the range positioned on a lower side is set as a second range, and the range positioned in a middle is set as a third range, and when the indoor unit for an air conditioner is provided on a side wall in the air-conditioning target space such that a center of the blow-out port (15) is at a position of 2000 mm above from the floor surface, an average wind velocity in the first range and an average wind velocity in the second range are substantially equal to each other, and an average wind velocity in the third range is equal to or more than 0.5 times and less than 1.1 times of the average wind velocity in the first range.

DESCRIPTION OF EMBODIMENTS

Hereinafter, an embodiment of the present disclosure will be described with reference to the drawings. The following embodiment is presented as a substantially preferable example and does not intend to limit the present invention, applications thereof, or the range of the use thereof.

Embodiment

Configuration of Indoor Unit for Air Conditioner

Figure 1:
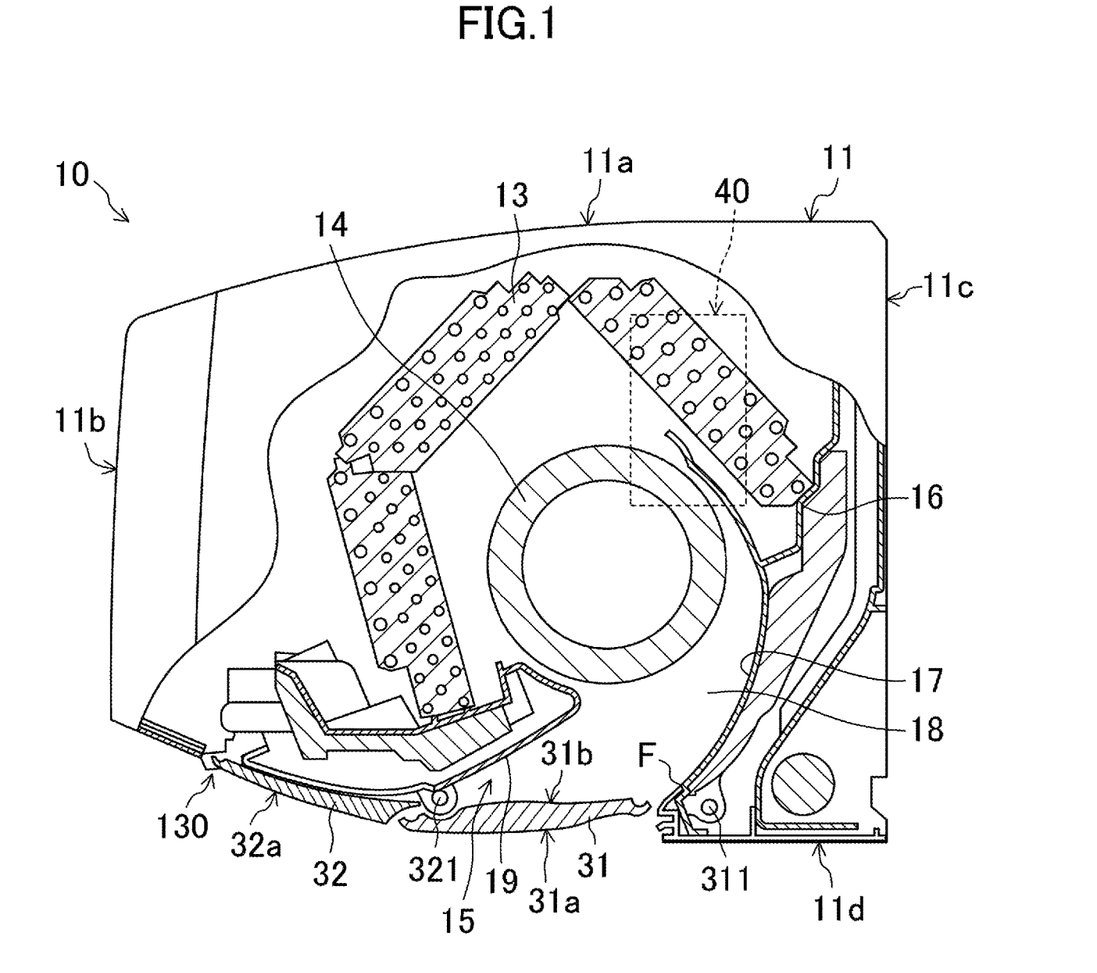
FIG. 1 is a sectional view of an indoor unit for an air conditioner according to an embodiment during operation stop.
Figure 2:
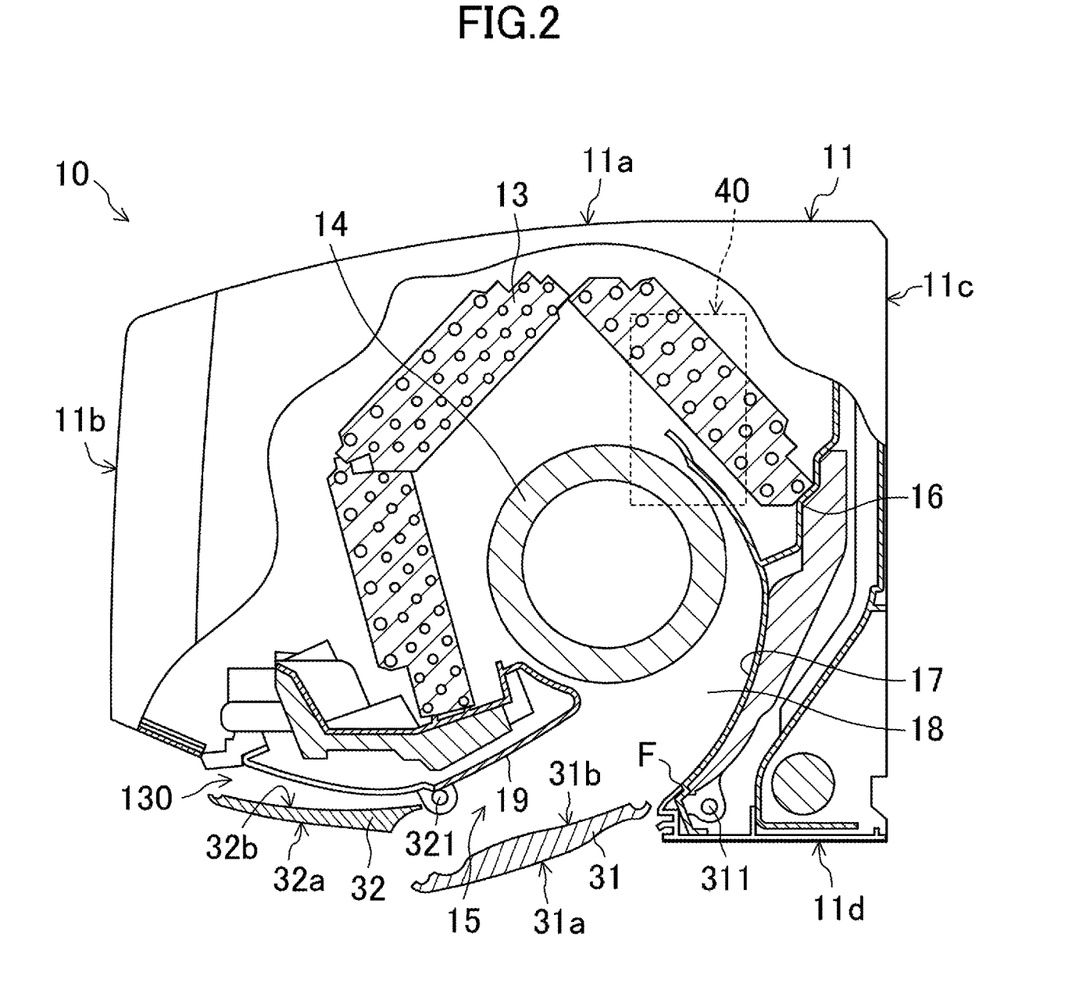
FIG. 2 is a sectional view of the indoor unit for an air conditioner according to an embodiment during operation in an upward blowing mode.

FIG. 1 is a sectional view of an air-conditioner indoor unit (10) according to the present embodiment during operation stop. FIG. 2 is a sectional view of the air-conditioner indoor unit (10) during operation.

The air-conditioner indoor unit (10) is of a wall-mount type to be installed on a side wall in an air-conditioning target space. The air-conditioner indoor unit (10) mainly includes a body casing (11), a heat exchanger (13), a fan (14), a bottom frame (16), and a control unit (40). The air-conditioner indoor unit (10) is configured to be capable of changing the direction of an airflow that is blown out through a blow-out port (15).

The body casing (11) has a top surface portion (11a), a front surface panel (11b), a back surface plate (11c), and a bottom surface plate (11d). In the inside of the body casing (11), the heat exchanger (13), the fan (14), the bottom frame (16), the control unit (40), and the like are housed.

The top surface portion (11a) is positioned at an upper portion of the body casing (11). An intake port (not illustrated) is provided at a front portion of the top surface portion (11a).

The front surface panel (11b) constitutes the front surface part of the air-conditioner indoor unit (10) and has a flat shape with no intake port. The upper end of the front surface panel (11b) is rotatably supported by the top surface portion (11a). Consequently, the front surface panel (11b) is movable in a hinge manner.

The heat exchanger (13) and the fan (14) are mounted on the bottom frame (16). The heat exchanger (13) exchanges heat with passing air to thereby regulate the temperature of the air. The heat exchanger (13) has an inverted V-shape in which both ends are bent downward in a side view. The fan (14) is positioned below the heat exchanger (13). The fan (14) is, for example, a cross-flow fan and causes air that is taken in from the inside of a room to pass through the heat exchanger (13) and to be blown out into the inside of the room.

The bottom surface plate (11d) is provided with the blow-out port (15). The blow-out port (15) is a rectangular opening having long sides in the lateral direction (direction orthogonal to the sheet of FIG. 1).

A first wind-direction regulating plate (31) that changes the direction of an airflow (hereinafter may be referred to as blow-out air) blown out through the blow-out port (15) is rotatably mounted along the long side of the blow-out port (15) on the side of the back surface plate (11c). The first wind-direction regulating plate (31) may be constituted by one plate that has a length substantially the same as the length of the blow-out port (15) and that is not divided. The first wind-direction regulating plate (31) is driven by a motor (not illustrated) and is capable of not only changing the direction of blow-out air but also opening and closing the blow-out port (15). The first wind-direction regulating plate (31) can take a plurality of orientations having different inclination angles.

A second wind-direction regulating plate (32) is provided along the long side of the blow-out port (15) on the side of the front surface panel (11b). The second wind-direction regulating plate (32) may be constituted by one plate that has a length substantially the same as the length of the blow-out port (15) and that is not divided. The second wind-direction regulating plate (32) can be caused by a motor (not illustrated) to take a plurality of orientations having different inclination angles in the front-rear direction. During operation stop, the second wind-direction regulating plate (32) is housed in a housing portion (130) provided at the bottom surface plate (11d).

The blow-out port (15) is connected to the inside of the body casing (11) by a blow-out flow path (18). The blow-out flow path (18) is formed along a back-surface-side scroll (17) of the bottom frame (16) from the blow-out port (15). The back-surface-side scroll (17) is a partition wall that constitutes a portion of the bottom frame (16) and is curved to face the fan (14). A terminal end (F) of the back-surface-side scroll (17) is positioned in the vicinity of the peripheral edge of the blow-out port (15). The body casing (11) is provided with a front-surface-side scroll (19) that faces the back-surface-side scroll (17) with the blow-out flow path (18) therebetween.

When the fan (14) is operated, indoor air is taken in through the intake port of the top surface portion (11a) by the fan (14) via the heat exchanger (13) and is blown out from the fan (14) through the blow-out port (15) via the blow-out flow path (18). The air that passes through the blow-out flow path (18) moves forward along the back-surface-side scroll (17) and is sent in the tangential direction of the terminal end (F) of the back-surface-side scroll (17).

The control unit (40) is positioned on the side of the heat exchanger (13) and the fan (14) when, for example, the body casing (11) is viewed from the front of the front surface panel (11b). The control unit (40) performs switching of blow-out modes, which will be described later, control of the number of rotations of the fan (14), control of the operation of the first wind-direction regulating plate (31) and the second wind-direction regulating plate (32), control of the temperature of the heat exchanger (13), and the like.

Although not illustrated, a perpendicular wind-direction regulating plate may be provided at a portion in the blow-out flow path (18) closer to the fan (14) than the first wind-direction regulating plate (31). The perpendicular wind-direction regulating plate has a plurality of blade pieces and a coupling rod that couples the plurality of blade pieces. By the motor (not illustrated) causing the coupling rod to reciprocate horizontally in the longitudinal direction of the blow-out port (15), the plurality of blade pieces swing leftward and rightward with respect to a state perpendicular to the longitudinal direction.

Configuration and Operation of First Wind-Direction Regulating Plate

An outer surface (31a) of the first wind-direction regulating plate (31) is completed to be on the extension of the outer surface of the bottom surface plate (11d) in a state in which the first wind-direction regulating plate (31) closes the blow-out port (15). An inner surface (31b) (refer to FIG. 2) of the first wind-direction regulating plate (31) is completed to be substantially parallel to the outer surface (31a).

A rotary shaft (311) of the first wind-direction regulating plate (31) is provided at the peripheral edge of the blow-out port (15) on the side of the back surface plate (11c) (at a position below the back-surface-side scroll (17)). The base portion of the first wind-direction regulating plate (31) and the rotary shaft (311) are coupled together with a predetermined interval kept therebetween. The rotary shaft (311) is coupled to a rotary shaft of a motor (not illustrated) fixed to the body casing (11).

By the rotary shaft (311) rotating counterclockwise in the front view in FIG. 1, the tip portion of the first wind-direction regulating plate (31) is moved away from the blow-out port (15), thereby opening the blow-out port (15). Conversely, by the rotary shaft (311) rotating clockwise in the front view in FIG. 1, the tip portion of the first wind-direction regulating plate (31) is moved to approach the blow-out port (15), thereby closing the blow-out port (15).

In a state in which the first wind-direction regulating plate (31) opens the blow-out port (15), the blow-out air blown out through the blow-out port (15) flows substantially along the inner surface (31b) of the first wind-direction regulating plate (31). In other words, the direction of an airflow that is blown out substantially in the tangential direction of the terminal end (F) of the back-surface-side scroll (17) is changed by the first wind-direction regulating plate (31).

Configuration and Operation of Second Wind-Direction Regulating Plate

An outer surface (32a) of the second wind-direction regulating plate (32) is completed to be on the extension of the outer surface of the bottom surface plate (11d) in a state in which the second wind-direction regulating plate (32) is housed in the housing portion (130). An inner surface (32b) of the second wind-direction regulating plate (32) is completed to be along the surface of the housing portion (130).

A rotary shaft (321) of the second wind-direction regulating plate (32) is provided at the peripheral edge of the blow-out port (15) on the side of the front surface panel (11b) (in the vicinity of the terminal end of the front-surface-side scroll (19)). In other words, the second wind-direction regulating plate (32) is provided to be continuous with the front-surface-side scroll (19). The base portion of the second wind-direction regulating plate (32) and the rotary shaft (321) are coupled together. The rotary shaft (321) is coupled to a rotary shaft of a motor (not illustrated) fixed to the body casing (11).

By the rotary shaft (321) rotating counterclockwise in the front view in FIG. 1, the tip portion of the second wind-direction regulating plate (32) is separated from the housing portion (130). Conversely, by the rotary shaft (321) rotating clockwise in the front view in FIG. 1, the tip portion of the second wind-direction regulating plate (32) is caused to approach the housing portion (130) and is eventually housed in the housing portion (130).

Direction Control of Blow-Out Air

In any of cooling operation, heating operation, dehumidifying operation, humidifying operation, and air-blowing operation, the air-conditioner indoor unit (10) can switch the blow-out modes among, for example, an "upward blowing mode", an "oblique blowing mode", a "wide mode", and a "downward blowing mode" by controlling the first wind-direction regulating plate (31), the second wind-direction regulating plate (32), and the like.

In the following description, the "upward blowing mode", the "oblique blowing mode", and the "downward blowing mode" may be collectively referred to as the "normal mode". Types of the blow-out modes and blow-out directions can be selected by a user via a remote controller or the like or can be set by the control unit (40) automatically.

FIG. 2 to FIG. 5 are sectional views in each of which the air-conditioner indoor unit (10) is operated in the "upward blowing mode", the "oblique blowing mode", the "wide mode", or the "downward blowing mode".

In the "upward blowing mode", as illustrated in FIG. 2, the control unit (40) rotates the first wind-direction regulating plate (31) to a position at which the inner surface (31b) of the first wind-direction regulating plate (31) is directed downward slightly obliquely relative to the horizontal direction and rotates the second wind-direction regulating plate (32) to a position at which the outer surface (32a) of the second wind-direction regulating plate (32) is directed upward slightly obliquely relative to the horizontal direction. Consequently, the airflow that is blown out through the blow-out port (15) moves forward along a ceiling in the air-conditioning target space by passing between the first wind-direction regulating plate (31) and the second wind-direction regulating plate (32) and becomes a circulation airflow that circulates in the entirety of the inside of the room.

Figure 3:
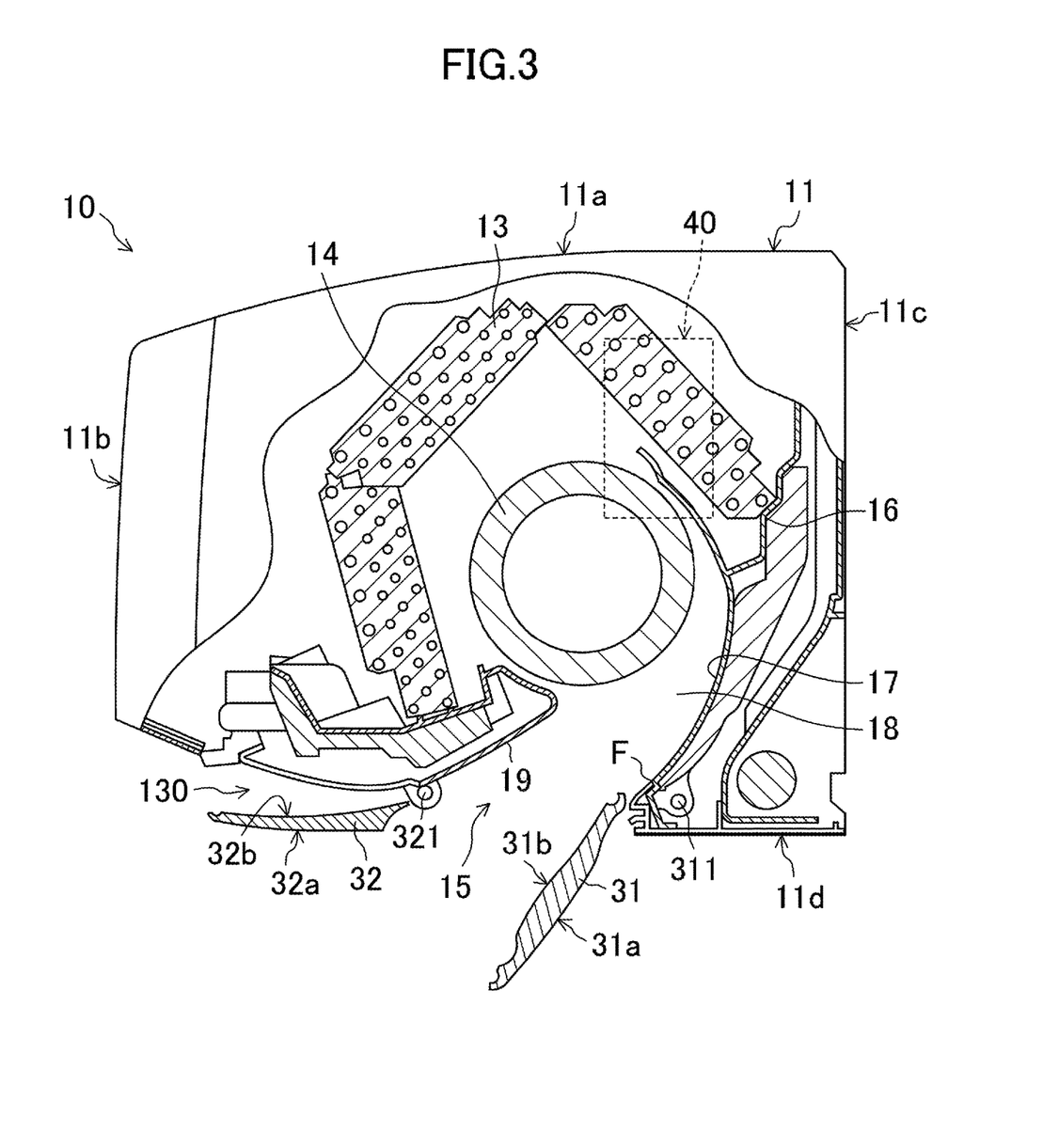
FIG. 3 is a sectional view of the indoor unit for an air conditioner according to an embodiment during operation in an oblique blowing mode.

In the "oblique blowing mode", as illustrated in FIG. 3, the control unit (40) rotates the first wind-direction regulating plate (31) to a position at which the inner surface (31b) of the first wind-direction regulating plate (31) is directed substantially in the tangential direction of the terminal end (F) of the back-surface-side scroll (17) and rotates the second wind-direction regulating plate (32) to a position at which the outer surface (32a) of the second wind-direction regulating plate (32) is directed substantially in the horizontal direction. Consequently, the airflow that is blown out through the blow-out port (15) moves forward obliquely downward as it is by passing between the first wind-direction regulating plate (31) and the second wind-direction regulating plate (32). In the "oblique blowing mode", the volume of the blow-out air can be maximum.

Figure 4:
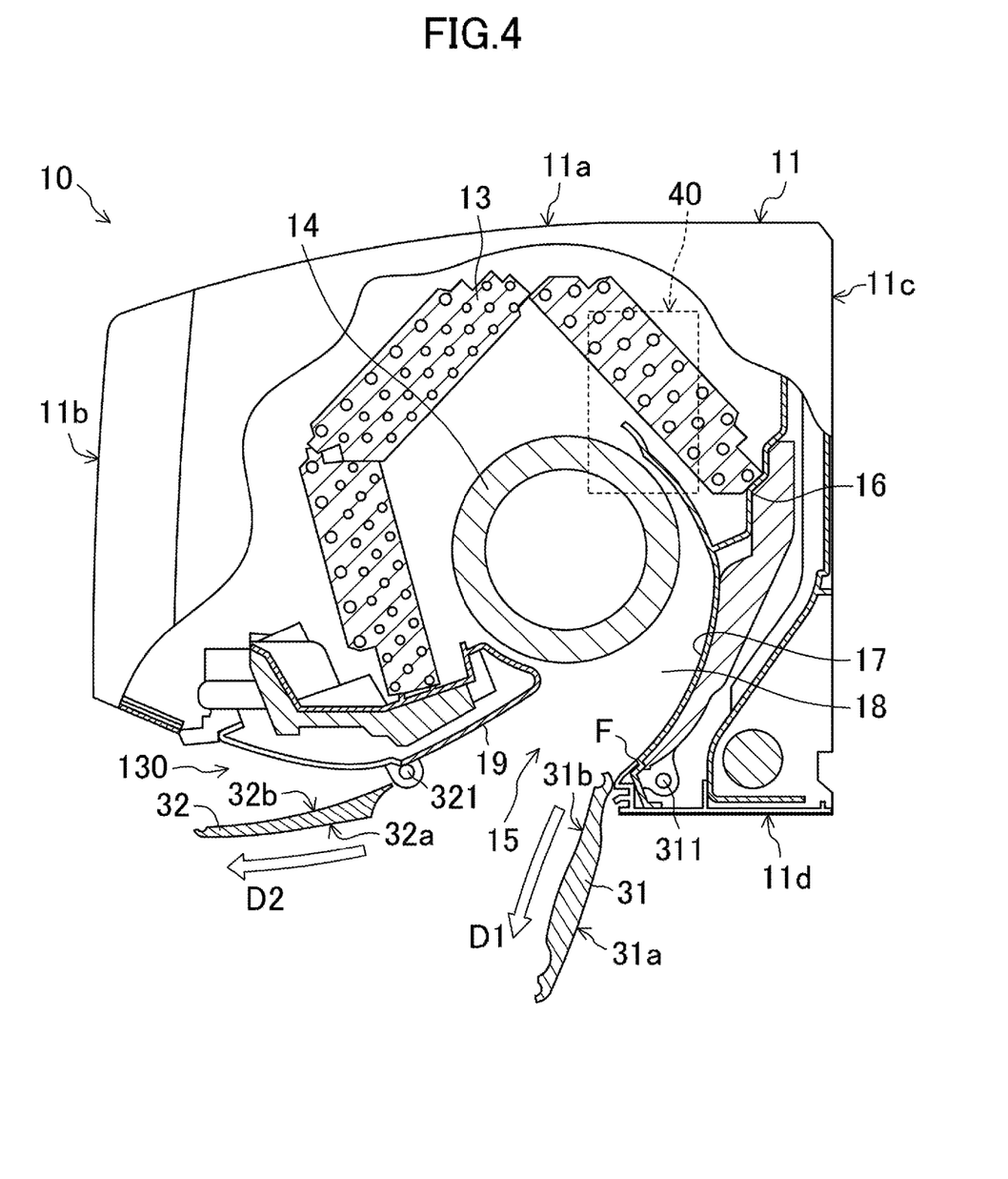
FIG. 4 is a sectional view of the indoor unit for an air conditioner according to an embodiment during operation in a wide mode.

In the "wide mode", as illustrated in FIG. 4, the control unit (40) rotates the first wind-direction regulating plate (31) to a position at which the inner surface (31b) of the first wind-direction regulating plate (31) is directed slightly downward relative to the tangential direction of the terminal end (F) of the back-surface-side scroll (17) and rotates the second wind-direction regulating plate (32) to a position at which the outer surface (32a) of the second wind-direction regulating plate (32) is directed downward slightly obliquely relative to the horizontal direction. Consequently, the airflow that is blown out through the blow-out port (15) moves obliquely downward by being divided due to the Coanda effect into an airflow D1 that moves forward along the inner surface (31b) of the first wind-direction regulating plate (31) and an airflow D2 that moves forward along the outer surface (32a) of the second wind-direction regulating plate (32). In other words, the airflow is downwardly extended by the first wind-direction regulating plate (31), and the airflow is extended upwardly by the second wind-direction regulating plate (32). As a result, it is possible in the "wide mode" to extend at least vertically a range that is to be reached by the airflow in the air-conditioning target space, compared with the other "normal mode".

To cause an airflow not to easily separate from the back-surface-side scroll (17) and the front-surface-side scroll (19) when the airflow is blown out through the blow-out port (15), the first wind-direction regulating plate (31) and the second wind-direction regulating plate (32) may be provided such that the airflow can pass also along the outer surface (31a) of the first wind-direction regulating plate (31) and the inner surface (32b) of the second wind-direction regulating plate (32).

Figure 5:
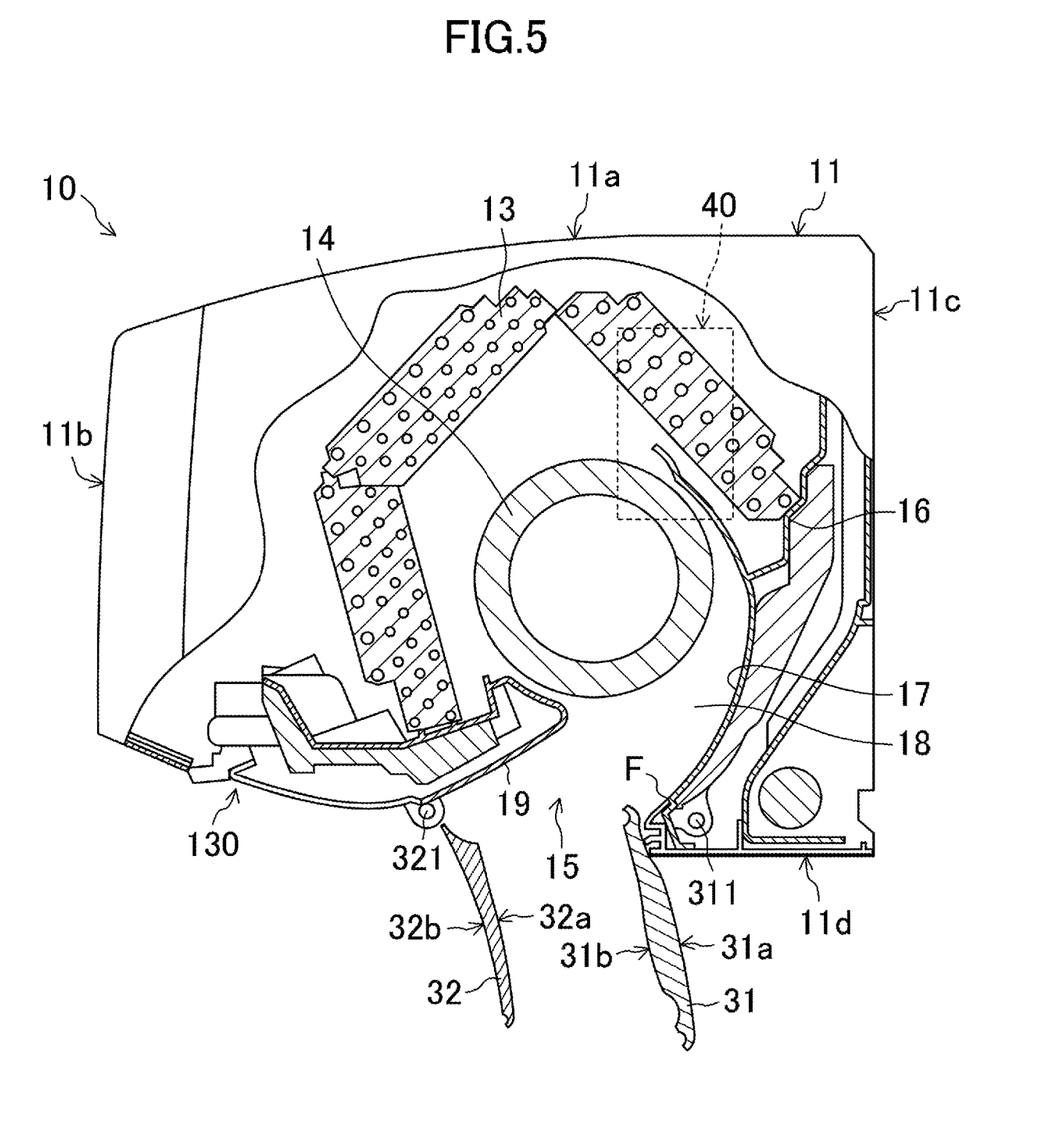
FIG. 5 is a sectional view of the indoor unit for an air conditioner according to an embodiment during operation in a downward blowing mode.

In the "downward blowing mode", as illustrated in FIG. 5, the control unit (40) rotates the first wind-direction regulating plate (31) to a position at which the inner surface (31b) of the first wind-direction regulating plate (31) is directed slightly obliquely toward the back surface plate (11c) relative to the vertically downward direction and rotates the second wind-direction regulating plate (32) to a position at which the outer surface (32a) of the second wind-direction regulating plate (32) is directed slightly obliquely toward the back surface plate (11c) relative to the vertically downward direction. Consequently, the airflow that is blown out through the blow-out port (15) moves forward along a side wall in the air-conditioning target space by passing between the first wind-direction regulating plate (31) and the second wind-direction regulating plate (32) and becomes a circulation airflow that circulates in the entirety of the inside of the room.

Wide Mode

Figure 6:
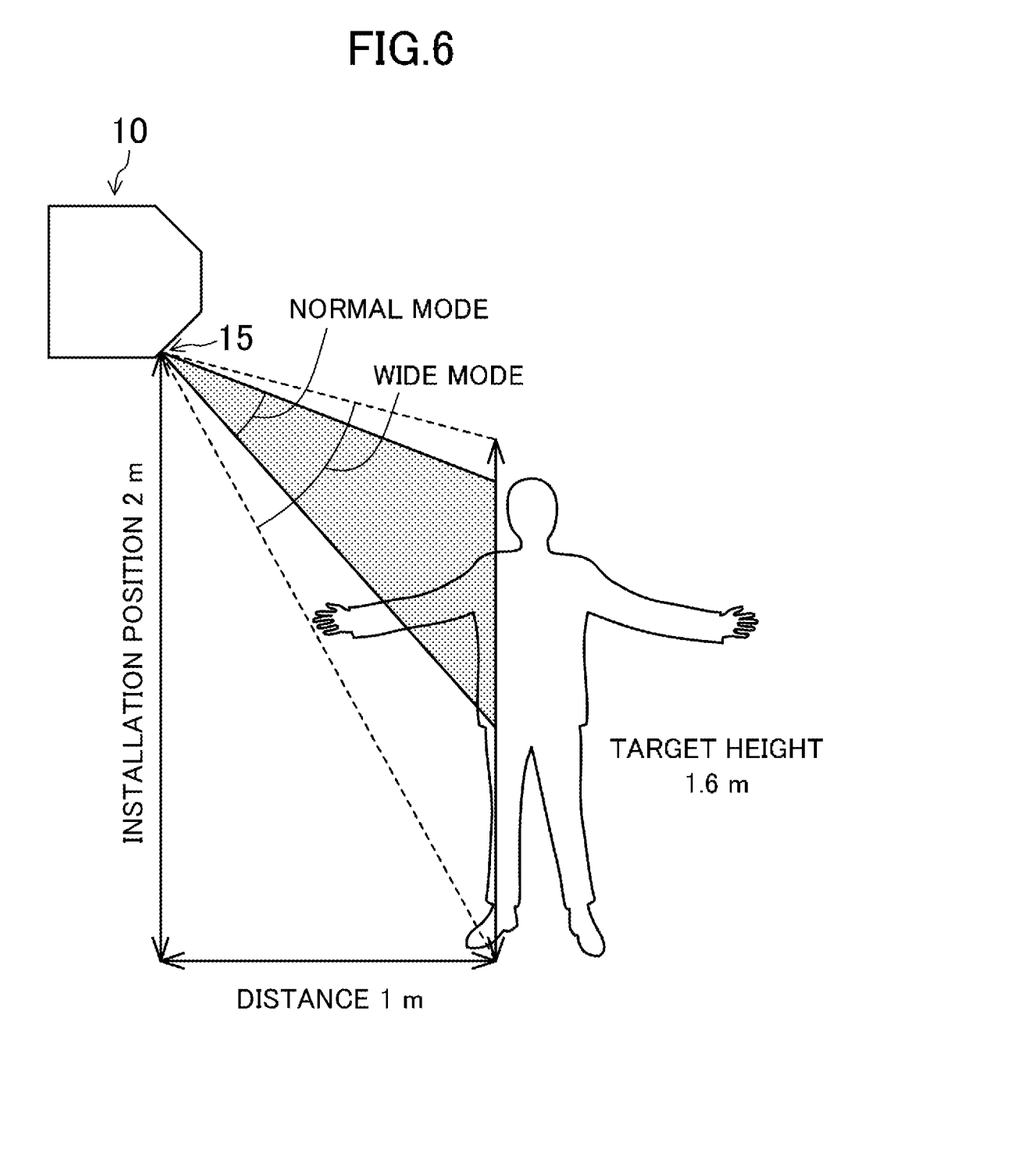
FIG. 6 is a diagram illustrating a difference between the wide mode and a normal mode in the indoor unit for an air conditioner according to an embodiment.

FIG. 6 is a diagram illustrating a difference between the "wide mode" and the "normal mode ("oblique blowing mode")" in the air-conditioner indoor unit (10).

As illustrated in FIG. 6, when the air-conditioner indoor unit (10) is installed such that the position of the blow-out port (15) is at a position of 2 m high from the floor surface in the air-conditioning target space and when a person having a body length of 1.6 m stands at a position away from the blow-out port (15) by 1 m on the front side, the blow-out air hits only the upper body of the person in the "normal mode".

In contrast, it is possible in the "wide mode" to cause the blow-out air to hit the whole body of the person since the range that is to be reached by the blow-out air is extended vertically compared with the "normal mode".

In the "wide mode", the following state of the blow-out air is achieved by the control unit (40). This is on the premise that the width (short-side length) of the blow-out port (15) is 300 mm or less.

When (1) a range of 1600 mm high from a floor surface at a position away from the blow-out port (15) by any distance within a range of 1000 mm to 2000 mm on the front side is set as a reference height range, (2) among three ranges obtained by equally dividing the reference height range into three in the height direction, the range positioned on the upper side is set as a first range, the range positioned on the lower side is set as a second range, and the range positioned in the middle is set as a third range, and (3) the air-conditioner indoor unit (10) is provided on a side wall in the air-conditioning target space such that the center of the blow-out port (15) is at a position of 2000 mm above from the floor surface, (4) an average wind velocity in the first range and an average wind velocity in the second range are substantially equal to each other, and an average wind velocity in the third range is less than 1.5 times of the average wind velocity in the first range.

The state of the blow-out air in the "wide mode" is achieved in a range of at least 1000 mm or more in a direction parallel to the long sides of the blow-out port (15). In the "wide mode", the average wind velocity in the third range is preferably equal to or more than 0.5 times and less than 1.1 times of the average wind velocity in the first range. In the "wide mode", an average wind velocity in the reference height range may be 0.5 m/s or more. In the "wide mode", the width of the blow-out port (15) may be 150 mm or less. In the "wide mode", a percentage of a turbulent flow region occupying the entirety of the blow-out air that is immediately after (in other words, in the vicinity of the blow-out port (15)) being blown out through the blow-out port (15) is preferably less than 30%.

Figure 7:
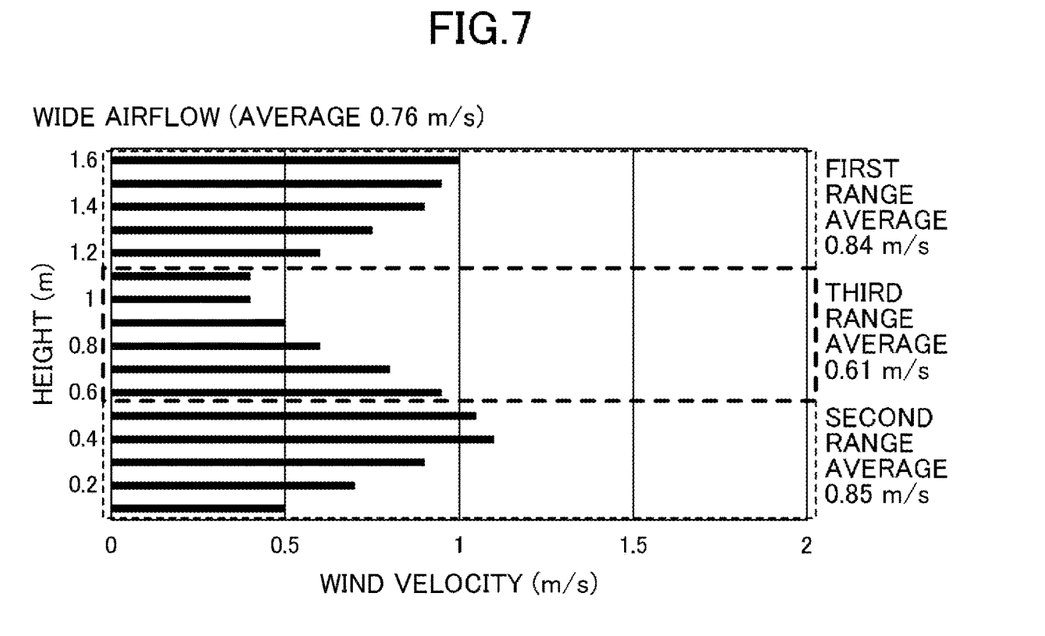
FIG. 7 is a graph showing one example of a wind velocity distribution of an airflow that is blown out in the wide mode in the indoor unit for an air conditioner according to an embodiment.
Figure 8:
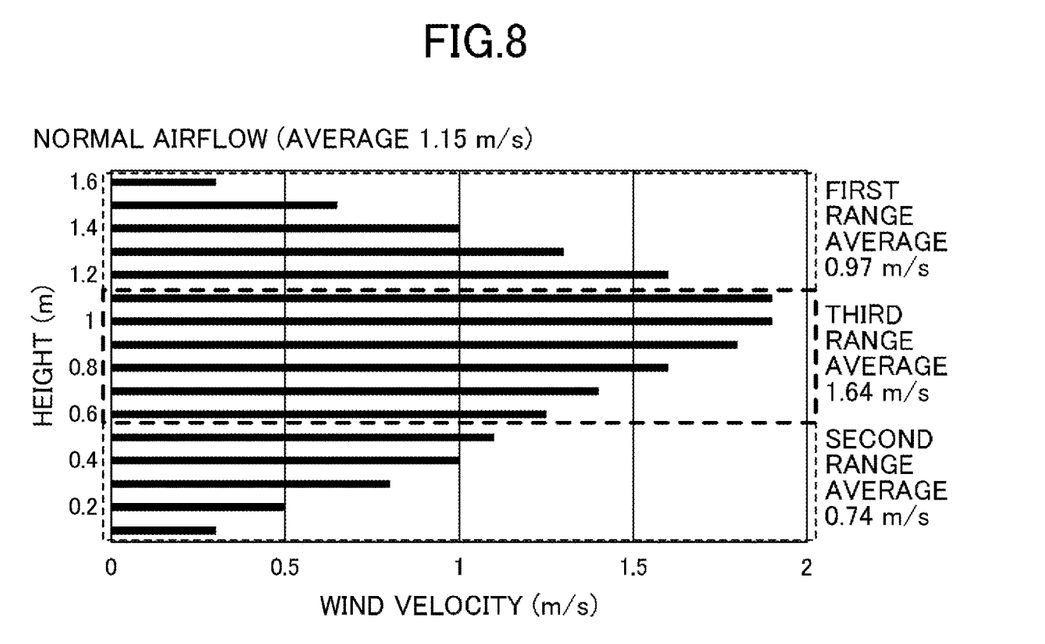
FIG. 8 is a graph showing one example of a wind velocity distribution of an airflow that is blown out in the normal mode in the indoor unit for an air conditioner according to an embodiment.

FIG. 7 is a graph showing one example of a wind velocity distribution of an airflow that is blown out in the "wide mode" in the air-conditioner indoor unit (10). FIG. 8 is a graph showing one example of a wind velocity distribution of an airflow that is blown out in the "normal mode" in the air-conditioner indoor unit (10). The results in FIG. 7 and FIG. 8 show wind velocity distributions in the "first range", the "second range", and the "third range" when the air-conditioner indoor unit (10) is provided on a side wall in the air-conditioning target space such that the center of the blow-out port (15) is at a position of 2000 mm above from the floor surface with the above-described "reference height range" being set in a range of 1600 mm high from the floor surface at a position away from the blow-out port (15) by 1000 mm on the front side.

In the wind velocity distribution in FIG. 7, the average wind velocity in the reference height range is 0.76 m/s, and the average wind velocities in the first, second, and third ranges are 0.84 m/s, 0.85 m/s, and 0.61 m/s, respectively. Accordingly, the average wind velocity (0.84 m/s) in the first range and the average wind velocity (0.85 m/s) in the second range are substantially equal to each other, and the average wind velocity (0.61 m/s) in the third range is about 0.73 times, which is less than 1.5 times, of the average wind velocity (0.84 m/s) in the first range. In other words, the "wide mode" is achieved.

In the wind velocity distribution in FIG. 8, the average wind velocity in the reference height range is 1.15 m/s, and the average wind velocities in the first, second, and third ranges are 0.97 m/s, 0.74 m/s, and 1.64 m/s, respectively. Accordingly, the average wind velocity (0.97 m/s) in the first range and the average wind velocity (0.74 m/s) in the second range differ from each other by 0.2 m/s or more, and the average wind velocity (1.64 m/s) in the third range is about 1.69 times, which is more than 1.5 times, of the average wind velocity (0.97 m/s) in the first range. In other words, the mode is not the "wide mode".

Comparing the "wide mode" with the "normal mode" when the capacity (air conditioning capacity) of the air-conditioner indoor unit (10) and the wind velocity (average wind velocity) of the blow-out air are the same therebetween, the area of the airflow (a range in which the blow-out air passes through in the height direction) is larger in the "wide mode", as illustrated in FIG. 6. Therefore, the air volume (volume of the blow-out air) is larger in the "wide mode" while a difference between the temperature (hereinafter referred to as the "blow-out temperature") of the blow-out air and an intake temperature (that is, an indoor temperature) is small. Thus, the "wide mode" can further improve a comfortable feeling by, for example, suppressing a decrease in a feeling temperature due to a draft feeling during cooling.

In the present embodiment, when a difference between a set temperature of the air-conditioner indoor unit (10) and an intake temperature is large (for example, 3° C. or more) as with, for example, when the operation of the air-conditioner indoor unit (10) is started, when a set temperature is changed, or the like, in other words, when an air conditioning load is higher than a predetermined value, the control unit (40) switches to the "wide mode", which is efficient in terms of air conditioning capacity. Consequently, it is possible to perform comfortable air conditioning while suppressing an increase in the air conditioning capacity even when the air conditioning load is high.

When switching to the "wide mode", the control unit (40) may increase the number of rotations of the fan (14) to suppress a decrease in the wind velocity of the blow-out air. In addition, to reduce a difference between an intake temperature and a blow-out temperature compared with the "normal mode" or to cause the difference between the intake temperature and the blow-out temperature to be a predetermined value or less when switching to the "wide mode", the control unit (40) may control the air conditioning capacity, for example, regulate the number of rotations of a compressor of an outdoor unit (not illustrated) or the opening degree of an electric valve.

In the "wide mode", since the Coanda effect is used to extend the area of the airflow, separation of the airflow easily occurs on the inner surface (31*b*) of the first wind-direction regulating plate (31) and on the outer surface (32*a*) of the second wind-direction regulating plate (32). Therefore, condensation easily occurs during cooling as a result of contact between cool wind and room temperature air on the inner surface (31*b*) of the first wind-direction regulating plate (31) and on the outer surface (32*a*) of the second wind-direction regulating plate (32).

Thus, in the present embodiment, the control unit (40) may switch to the "normal mode" when the "wide mode" has been continued for a predetermined period or more during cooling. In this case, the air conditioning capacity of the "normal mode" may be increased to an air conditioning capacity at the time before switching to the "wide mode".

The "normal mode", in particular, the "upward blowing mode" and the "downward blowing mode" are suitable for heating and cooling the entirety of a room by a circulation airflow that circulates in the entirety of the inside of the room.

Thus, in the present embodiment, the air-conditioner indoor unit (10), a remote controller, or the like may be provided with a person detector, for example, a room occupancy sensor, and the control unit (40) may switch between the "normal mode" and the "wide mode" on the basis of presence/absence of a person inside and outside a range that is to be reached by the blow-out air of the "wide mode" in the air-conditioning target space. For example, when the number of persons in a room is two or more, the mode may be switched from the "wide mode" to the "normal mode". The mode may be switched to the "wide mode" when persons are present only in the "aforementioned range", and the mode may be switched to the "normal mode" when persons are present in both of the "aforementioned range" and the "other ranges". When the number of persons in a room has decreased, the mode may be switched from the "normal mode" to the "wide mode".

In the present embodiment, the control unit (40) may cause the temperature of at least a portion of the heat exchanger (13) to be lower than a dew temperature in the air-conditioning target space in the "wide mode" during cooling.

In the present embodiment, the control unit (40) may vary in the "wide mode" the blow-out velocity of the airflow as in, for example, the 1/f fluctuation and a wind-velocity jump. Specifically, the blow-out velocity of the airflow may be varied in a range of, for example, 0 to 0.5 m/s by changing the number of rotations of the fan (14), the angles of the first wind-direction regulating plate (31) and the second wind-direction regulating plate (32), the angles of the back-surface-side scroll (17) and the front-surface-side scroll (19), and the like.

Effects of Embodiment

According to the air-conditioner indoor unit (10) of the present embodiment described above, the range that is to be reached by the airflow blown out through the blow-out port (15) is extended in the "wide mode" to be larger than in the "normal mode", and thus, it is possible to achieve a predetermined indoor temperature (set temperature) by causing a blow-out temperature to be closer to an intake temperature than in the "normal mode" when compared on the basis of the same air conditioning capacity and the same blow-out velocity. Accordingly, when the air conditioning load is increased as with when operation is started, when the set temperature is changed, or the like, it is possible to immediately heat and cool the body of a user with a spread airflow while suppressing a draft feeling by switching to the "wide mode".

The airflow of the "wide mode" is an airflow that blows across not only a portion of the body of a user but also the whole body and thus improves the comfortable feeling of the user. By the airflow of the "wide mode" hitting the whole body of the user, a variation in the temperature distribution on the body of the user is reduced. The load on the body of the user is thus reduced.

In the "wide mode", the range that is to be reached by the airflow is extended to be larger than in the "normal mode" and thus is less likely to be limited by layout, furniture arrangement, the installation place of the air-conditioner indoor unit (10), and the like. In other words, even when an obstacle is present in the inside of a room, the airflow of the "wide mode" easily flows around the obstacle. The temperature variation in the room is thus small.

In the air-conditioner indoor unit (10) according to the present embodiment, by the control unit (40) increasing the number of rotations of the fan (14) in the "wide mode" compared with before the "wide mode" is started, it is possible to maintain the blow-out velocity to be the same as that in the normal mode even when the range that is to be reached by the airflow is extended in the "wide mode" to be larger than that in the "normal mode".

In the air-conditioner indoor unit (10) according to the present embodiment, by the control unit (40) reducing a difference between an intake temperature and a blow-out temperature in the "wide mode" compared with the "normal mode", it is possible to further suppress a draft feeling than in the "normal mode" while maintaining the blow-out velocity without increasing the air conditioning capacity.

In the air-conditioner indoor unit (10) according to the present embodiment, by the control unit (40) switching to the "normal mode" when the "wide mode" has been continued for a predetermined period or more during cooling, it is possible to suppress occurrence of condensation in the air-conditioner indoor unit (10) during cooling.

In the air-conditioner indoor unit (10) according to the present embodiment, by the control unit (40) switching between the "normal mode" and the "wide mode" on the basis of presence/absence of a person inside and outside the range that is to be reached by the blow-out air of the "wide mode" in the air-conditioning target space, it is possible to perform appropriate air conditioning on the basis of a presence state of a person in the air-conditioning target space.

In the air-conditioner indoor unit (10) according to the present embodiment, by the control unit (40) causing the temperature of at least a portion of the heat exchanger (13) to be lower than a dew temperature in the air-conditioning target space in the "wide mode" during cooling, it is possible to perform cooling while dehumidifying.

In the air-conditioner indoor unit (10) according to the present embodiment, by the control unit (40) varying the velocity of the blow-out air in the "wide mode", it is possible to blow out an airflow similar to comfortable natural wind.

Modification

Figure 9:
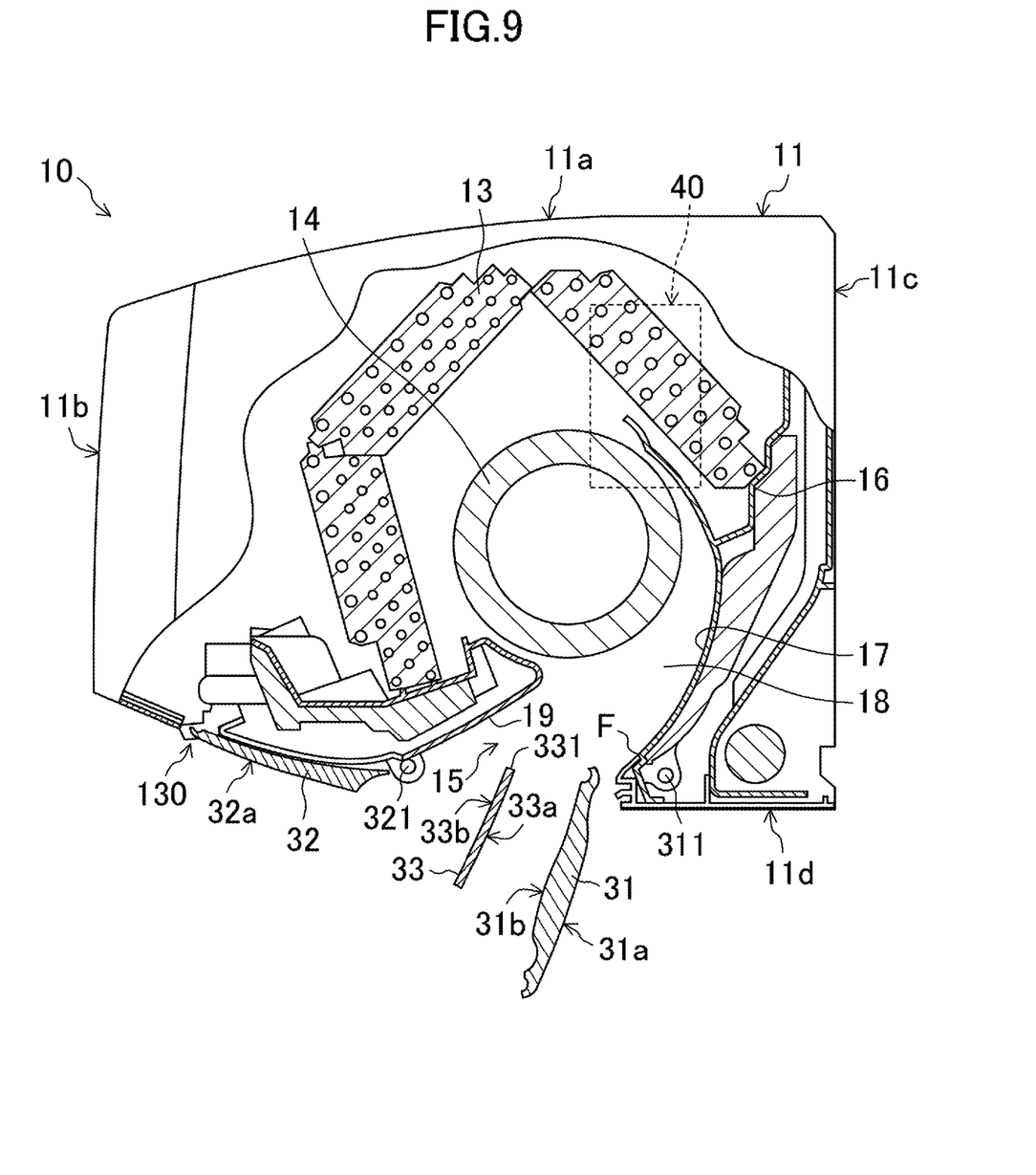
FIG. 9 is a sectional view of an indoor unit for an air conditioner according to a modification during operation in the wide mode.

FIG. 9 is a sectional view of the air-conditioner indoor unit (10) according to the present modification during operation in the wide mode. In FIG. 9, the same components as those of the air-conditioner indoor unit (10) according to the aforementioned embodiment illustrated in FIG. 4 are given the same signs.

The air-conditioner indoor unit (10) according to the present modification illustrated in FIG. 9 mainly differs from the air-conditioner indoor unit (10) according to the aforementioned embodiment illustrated in FIG. 4 in that a third wind-direction regulating plate (33) is provided between the first wind-direction regulating plate (31) and the second wind-direction regulating plate (32) at the blow-out port (15) to realize the "wide mode". An outer surface (33a) of the third wind-direction regulating plate (33) faces the inner surface (31b) of the first wind-direction regulating plate (31), and an inner surface (33b) of the third wind-direction regulating plate (33) faces the second wind-direction regulating plate (32). The third wind-direction regulating plate (33) may be constituted by one plate that has a length substantially the same as the length of the blow-out port (15) and that is not divided.

A rotary shaft (331) of the third wind-direction regulating plate (33) is provided in the vicinity of the center of the blow-out port (15) in the short-side direction. The base portion of the third wind-direction regulating plate (33) and the rotary shaft (331) are coupled together. The rotary shaft (331) is coupled to a rotary shaft of a motor (not illustrated) fixed to the body casing (11). The third wind-direction regulating plate (33) can be caused by the motor to take a plurality of orientations having different inclination angles in the front-rear direction.

By the rotary shaft (331) rotating counterclockwise in the front view in FIG. 1, the tip portion of the third wind-direction regulating plate (33) is moved away from the blow-out port (15). Conversely, by the rotary shaft (331) rotating clockwise in the front view in FIG. 1, the tip portion of the third wind-direction regulating plate (33) is moved to approach the blow-out port (15).

In addition, in the air-conditioner indoor unit (10) according to the present modification illustrated in FIG. 9, to suppress separation of the airflow from the front-surface-side scroll (19), the Coanda effect is increased by increasing the curvature of the terminal end portion of the front-surface-side scroll (19), and the third wind-direction regulating plate (33) is disposed closer to the front-surface-side scroll (19) than the back-surface-side scroll (17).

In addition, to suppress separation of the airflow from the first wind-direction regulating plate (31), the first wind-direction regulating plate (31) is spaced from the terminal end (F) of the back-surface-side scroll (17), and a passage for the airflow is provided along the outer surface (31a) of the first wind-direction regulating plate (31).

In the "wide mode" of the air-conditioner indoor unit (10) according to the present modification, the control unit (40) changes the angle of the third wind-direction regulating plate (33) such that the airflow that is blown out through the blow-out port (15) separates on the inner surface (33b) of the third wind-direction regulating plate (33) and that the airflow is divided into two at the tip portion of the third wind-direction regulating plate (33). To suppress separation of the airflow from the first wind-direction regulating plate (31), the control unit (40) gradually changes the angle of the first wind-direction regulating plate (31) to be, for example, "33°→39°→45°" or "50°→55°→60°" and changes the angle of the third wind-direction regulating plate (33) such that the tip portion of the third wind-direction regulating plate (33) is positioned close to the first wind-direction regulating plate (31).

In the present modification described above, it is also possible to obtain the same effects as those in the aforementioned embodiment. In the present modification, by adding the third wind-direction regulating plate (33), the airflow that is blown out through the blow-out port (15) is divided into two, and a configuration similar to a configuration in which two blow-out ports are provided is realized. In detail, in a configuration in which the second wind-direction regulating plate (32) is provided to be continuous with the front-surface-side scroll (19) and in which the first wind-direction regulating plate (31) and the third wind-direction regulating plate (33) are provided between the front-surface-side scroll (19) and the back-surface-side scroll (17), an airflow on the upper side is generated by the front-surface-side scroll (19) and the third wind-direction regulating plate (33), and an airflow on the lower side is generated by the back-surface-side scroll (17), the first wind-direction regulating plate (31), and the third wind-direction regulating plate (33). Consequently, it is possible to vertically extend the range that is to be reached by the airflow in the air-conditioning target space.

In the present modification, the blow-out air is extended vertically by three horizontal wind-direction regulating plates (horizontal flaps). As an alternative to this, the blow-out air may be extended vertically by four or more horizontal flaps.

Other Embodiments

In the embodiment and the modification described above, the air-conditioner indoor unit (10) has, as blow-out modes, the "upward blowing mode", the "oblique blowing mode", the "wide mode", and the "downward blowing mode" but may have different modes other than these modes additionally. Each of the "wide mode" and the other modes may have a plurality of sub-modes additionally. The range that is to be reached by the blow-out air of the "wide mode" in the air-conditioning target space may be movable in the height direction and the lateral direction (direction parallel to the long sides of the blow-out port (15)). The airflow that is blown out in the "wide mode" may be divided into two or more also in the lateral direction by providing a plurality of perpendicular wind-direction regulating plates such that the blow-out port (15) is demarcated into two or more regions in the long-side direction. Consequently, it is possible to extend the blow-out air also in the lateral direction and possible to reduce the variation in the wind velocity distribution of the blow-out air in the lateral direction.

In the embodiment and the modification described above, for example, when the state of air conditioning by the air-conditioner indoor unit (10) is stable, in other words, when the air conditioning load is relatively small, the control unit (40) may cause the air conditioning capacity of the "wide mode" to be lower than the air conditioning capacity of the "normal mode" when switching from the "normal mode" to the "wide mode". Consequently, it is possible to immediately heat and cool the body of a user with a spread airflow that hits the whole body of the user while further suppressing a draft feeling by lowering the velocity of the wind that hits the user.

In the embodiment and the modification described above, the air-conditioner indoor unit (10) is a wall-mount type to be installed on a side wall in an air-conditioning target space. However, as long as having the "wide mode" according to the present disclosure, the air-conditioner indoor unit (10) may be of a different type, for example, a ceiling pendant type, a floor installation type, or the like.

Embodiments and modifications have been described above; however, it should be understood that the forms and the details can be variously changed without departing from the gist and the scope of the claims. The above embodiments and the modifications may be combined together or replaced, as appropriate, provided that intended functions of the present disclosure are not lost. The wordings "first", "second", . . . in the above description are used to distinguish the terms given these wordings from each other and do not intend to limit the numbers and the order of the terms.

INDUSTRIAL APPLICABILITY

As described above, the present disclosure is useful for an indoor unit for an air conditioner.

EXPLANATION OF REFERENCES

10 air-conditioner indoor unit
11 body casing
11a top surface portion
11b front surface panel
11c back surface plate 11d bottom surface plate
13 heat exchanger
14 fan
15 blow-out port
16 bottom frame
17 back-surface-side scroll
18 blow-out flow path
19 front-surface-side scroll
31 first wind-direction regulating plate
31a outer surface
31b inner surface
311 rotary shaft
32 second wind-direction regulating plate
32a outer surface
32b inner surface
321 rotary shaft
33 third wind-direction regulating plate
33a outer surface
33b inner surface
331 rotary shaft
40 control unit
130 housing portion

The invention claimed is:

1. An indoor unit for an air conditioner, the indoor unit being configured to be installed in an air-conditioning target space and to be capable of changing a direction of an airflow that is blown out through a blow-out port, the indoor unit comprising:
a heat exchanger;
a fan; and
a wind direction regulator, wherein
the fan and the wind direction regulator are configured to selectively function in a normal mode and a wide mode, wherein, in the wide mode, an air conditioning load is higher than a predetermined value and at least vertically a range that is to be reached by the airflow in the air-conditioning target space in the wide mode is extended compared with the normal mode, and
wherein, in the wide mode,
when a range of 1600 mm high from a floor surface at a position away from the blow-out port by any distance within a range of 1000 mm to 2000 mm on a front side is set as a reference height range, and among three ranges obtained by equally dividing the reference height range into three in a height direction, the range positioned on an upper side is set as a first range, the range positioned on a lower side is set as a second range, and the range positioned in a middle is set as a third range, and when the indoor unit for the air conditioner is provided on a side wall in the air-conditioning target space such that a center of the blow-out port is at a position of 2000 mm above from the floor surface,
an average wind velocity in the first range and an average wind velocity in the second range are substantially equal to each other, and an average wind velocity in the third range is equal to or more than 0.5 times and less than 1.1 times of the average wind velocity in the first range.

2. The indoor unit for an air conditioner according to claim 1, the indoor unit further wherein:
the fan is configured to take in air from the air-conditioning target space and blow out the air into the air-conditioning target space, and
a number of rotations of the fan is higher in the wide mode compared with before the wide mode is started.

3. The indoor unit for an air conditioner according to claim 1,
wherein a difference between an intake temperature and a blow-out temperature is reduced in the wide mode compared with the normal mode.

4. The indoor unit for an air conditioner according to claim 2,
wherein a difference between an intake temperature and a blow-out temperature is reduced in the wide mode compared with the normal mode.

5. The indoor unit for an air conditioner according to claim 1,
wherein the indoor unit resumes the normal mode when the wide mode has been continued for a predetermined period or more during cooling.

6. The indoor unit for an air conditioner according to claim 2,
wherein the indoor unit resumes the normal mode when the wide mode has been continued for a predetermined period or more during cooling.

7. The indoor unit for an air conditioner according to claim 3,
wherein the indoor unit resumes the normal mode when the wide mode has been continued for a predetermined period or more during cooling.

8. The indoor unit for an air conditioner according to claim 1,
wherein the indoor unit selectively operates in the normal mode and the wide mode based on presence/absence of a person inside and outside of a range that is to be reached by the airflow of the wide mode in the air-conditioning target space.

9. The indoor unit for an air conditioner according to claim 2,
wherein the indoor unit selectively operates in the normal mode and the wide mode based on presence/absence of a person inside and outside of a range that is to be reached by the airflow of the wide mode in the air-conditioning target space.

10. The indoor unit for an air conditioner according to claim 3,
wherein the indoor unit selectively operates in the normal mode and the wide mode based on presence/absence of a person inside and outside of a range that is to be reached by the airflow of the wide mode in the air-conditioning target space.

11. The indoor unit for an air conditioner according to claim 5,
wherein the indoor unit selectively operates in the normal mode and the wide mode based on presence/absence of a person inside and outside of a range that is to be reached by the airflow of the wide mode in the air-conditioning target space.

12. The indoor unit for an air conditioner according to claim 1, the indoor unit wherein:
the heat exchanger is configured to exchange heat with air that is taken in from the air-conditioning target space to thereby regulate a temperature of the air, and
a temperature of at least a portion of the heat exchanger in the wide mode during cooling is lower than a dew temperature in the air-conditioning target space.

13. The indoor unit for an air conditioner according to claim 2, the indoor unit wherein:
the heat exchanger is configured to exchange heat with air that is taken in from the air-conditioning target space to thereby regulate a temperature of the air, and a temperature of at least a portion of the heat exchanger in the wide mode during cooling is lower than a dew temperature in the air-conditioning target space.

14. The indoor unit for an air conditioner according to claim 3, the indoor unit wherein:
   the heat exchanger is configured to exchange heat with air that is taken in from the air-conditioning target space to thereby regulate a temperature of the air, and
   a temperature of at least a portion of the heat exchanger in the wide mode during cooling is lower than a dew temperature in the air-conditioning target space.

15. The indoor unit for an air conditioner according to claim 5, the indoor unit wherein:
   the heat exchanger is configured to exchange heat with air that is taken in from the air-conditioning target space to thereby regulate a temperature of the air, and
   a temperature of at least a portion of the heat exchanger in the wide mode during cooling is lower than a dew temperature in the air-conditioning target space.

16. The indoor unit for an air conditioner according to claim 8, the indoor unit wherein:
   the heat exchanger is configured to exchange heat with air that is taken in from the air-conditioning target space to thereby regulate a temperature of the air, and
   a temperature of at least a portion of the heat exchanger in the wide mode during cooling is lower than a dew temperature in the air-conditioning target space.

17. The indoor unit for an air conditioner according to claim 1,
   wherein the indoor unit is configured such that a blow-out velocity of the airflow varies in the wide mode.

18. The indoor unit for an air conditioner according to claim 2,
   wherein the indoor unit is configured such that a blow-out velocity of the airflow varies in the wide mode.

19. The indoor unit for an air conditioner according to claim 3,
   wherein the indoor unit is configured to vary a blow-out velocity of the airflow in the wide mode.

20. The indoor unit for an air conditioner according to claim 5,
   wherein the indoor unit is configured to vary a blow-out velocity of the airflow in the wide mode.

* * * * *